(12) United States Patent
Hoekstra et al.

(10) Patent No.: US 7,693,097 B2
(45) Date of Patent: Apr. 6, 2010

(54) METHOD OF PREDICTING TRANSMISSION SPEED ADAPTATIONS

(75) Inventors: Geert Jan Hoekstra, Amersfoort (NL); Franciscus Panken, Bussum (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 387 days.

(21) Appl. No.: 11/463,389

(22) Filed: Aug. 9, 2006

(65) Prior Publication Data
US 2008/0039038 A1 Feb. 14, 2008

(51) Int. Cl.
*H04B 7/00* (2006.01)
*H04B 15/00* (2006.01)
*H04M 1/38* (2006.01)

(52) U.S. Cl. .............. 370/310; 455/504; 455/505; 455/506; 455/561

(58) Field of Classification Search .......... 370/310, 370/252; 455/561, 69, 522, 10, 504–506, 455/63.1, 65, 67.13
See application file for complete search history.

(56) References Cited

U.S. PATENT DOCUMENTS

| | | | |
|---|---|---|---|
| 6,556,553 B1 | 4/2003 | Palmer et al. | 370/333 |
| 6,873,606 B2* | 3/2005 | Agrawal et al. | 370/310 |
| 6,928,268 B1* | 8/2005 | Kroner | 455/69 |
| 2004/0229570 A1 | 11/2004 | Matsumura | 455/67.11 |
| 2006/0159030 A1* | 7/2006 | Strutt et al. | 370/252 |

FOREIGN PATENT DOCUMENTS

WO    WO 94/11955 A    5/1994

OTHER PUBLICATIONS

International Search Report and Written Opinion mailed Jan. 18, 2008.
XP010862135—Holter B et al., *Limitations in Spectral Efficiency of a rate-adaptive MIMO System Utilizing Pilot-Aided Channel Prediction* VTC 2003-Spring, The 57th IEEE Semiannual Vehicular Technology Conference; Proceedings. JEJU, Korea, Apr. 22-25, 2003, IEEE Vehicular Technology Conference, New York, NY: IEEE, US, vol. 4 of 4. Conf. 57, Apr. 22, 2003, pp. 282-286.

* cited by examiner

*Primary Examiner*—Lester Kincaid
*Assistant Examiner*—Kuo Woo
(74) *Attorney, Agent, or Firm*—Williams, Morgan & Amerson, P.C.

(57) ABSTRACT

The present invention provides a method that is implemented in a base station. The method includes predicting a transmission rate adaptation associated with a mobile unit during a first time interval. The prediction is based on a signal-to-noise ratio for transmission associated with the mobile unit in the first time interval. The predicted request is for a transmission rate adaptation that is predicted to occur during a second time interval subsequent to the first time interval. The method also includes performing a system reconfiguration or a resource reallocation for communication between the base station and the mobile unit at the predicted transmission rate during the second time interval. The system reconfiguration or the resource reallocation is performed prior to the second time interval.

14 Claims, 4 Drawing Sheets

METHOD OF PREDICTING TRANSMISSION SPEED ADAPTATIONS

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of geographic areas that are conventionally referred to as cells. Mobile units located in the coverage area of a cell may access the wireless communications system by establishing a wireless communication link, often referred to as an air interface, with a base station (or node-B) associated with the cell. The strength of signals received by the mobile unit from the base station decreases with increasing distance between the base station and the mobile unit due in part to the propagation loss of radio signals transmitted by the base station. Consequently, the mobile unit may find it increasingly difficult to decode the signals transmitted by the base station if the base station continues to transmit signals to the mobile unit at the same power level and at the same data transmission rate as the mobile unit moves away from the base station.

Some wireless communication systems, such as Universal Mobile Telecommunication Systems (UMTS), compensate for the degraded signal strength by using a power control loop to increase the transmission power used to transmit signals to more distant mobile units. However, increasing the transmission power to one mobile unit may decrease the power available to transmit signals to other mobile units. Furthermore, increasing the transmission power for one mobile unit may increase the interference experienced by other mobile units within the same cell and within neighboring cells. Consequently, simply increasing the transmission power to distant mobile units may decrease the overall system capacity, particularly when many mobile units are near the edge of a cell.

One alternative to using a power control loop to increase the transmission power when a mobile unit moves away from the base stations is rate adaptation. In a rate adapting scheme, the mobile unit may detect the reduction in the signal quality or strength as it moves away from the base station. For example, the mobile unit may fail to decode a particular transmission or the decoding failure rate may increase above a predetermined threshold. The mobile unit may then request that subsequent information be transmitted using a more robust coding scheme and a lower data transmission rate. Although selecting a more robust coding scheme may improve decoding at the mobile unit, better coding schemes typically occupy the wireless medium longer to transport the same amount of information, relative to the less robust coding schemes. Thus, the capacity available to the mobile units in a serviced area will drop as a result of one or more users performing rate adaptations.

Conventional wireless communication systems do not anticipate rate adaptations that may be performed for the mobile units in the system. This deficiency is due, at least in part, to the absence of a standardized technique for determining when a rate adaptation should be performed. To the contrary, different service providers (and even different mobile devices supplied by a single provider) typically implement different algorithms for determining when a rate adaptation should be performed. Even techniques for estimating signal-to-noise ratios differ from device to device. A wireless communication system may serve many different devices that are maintained by many different service providers, which makes it difficult for the wireless communication system to predict when (or if) a rate adaptation may occur. Thus, conventional wireless communication systems are not able to anticipate and prepare for capacity changes that may result from future rate adaptations.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for predicting at least one transmission rate adaptation associated with at least one mobile unit based on at least one signal-to-noise ratio for at least one transmission associated with the at least one mobile unit.

BRIEF DESCRIPTION OF THE DRAWINGS

The invention may be understood by reference to the following description taken in conjunction with the accompanying drawings, in which like reference numerals identify like elements, and in which.

Figure 1:
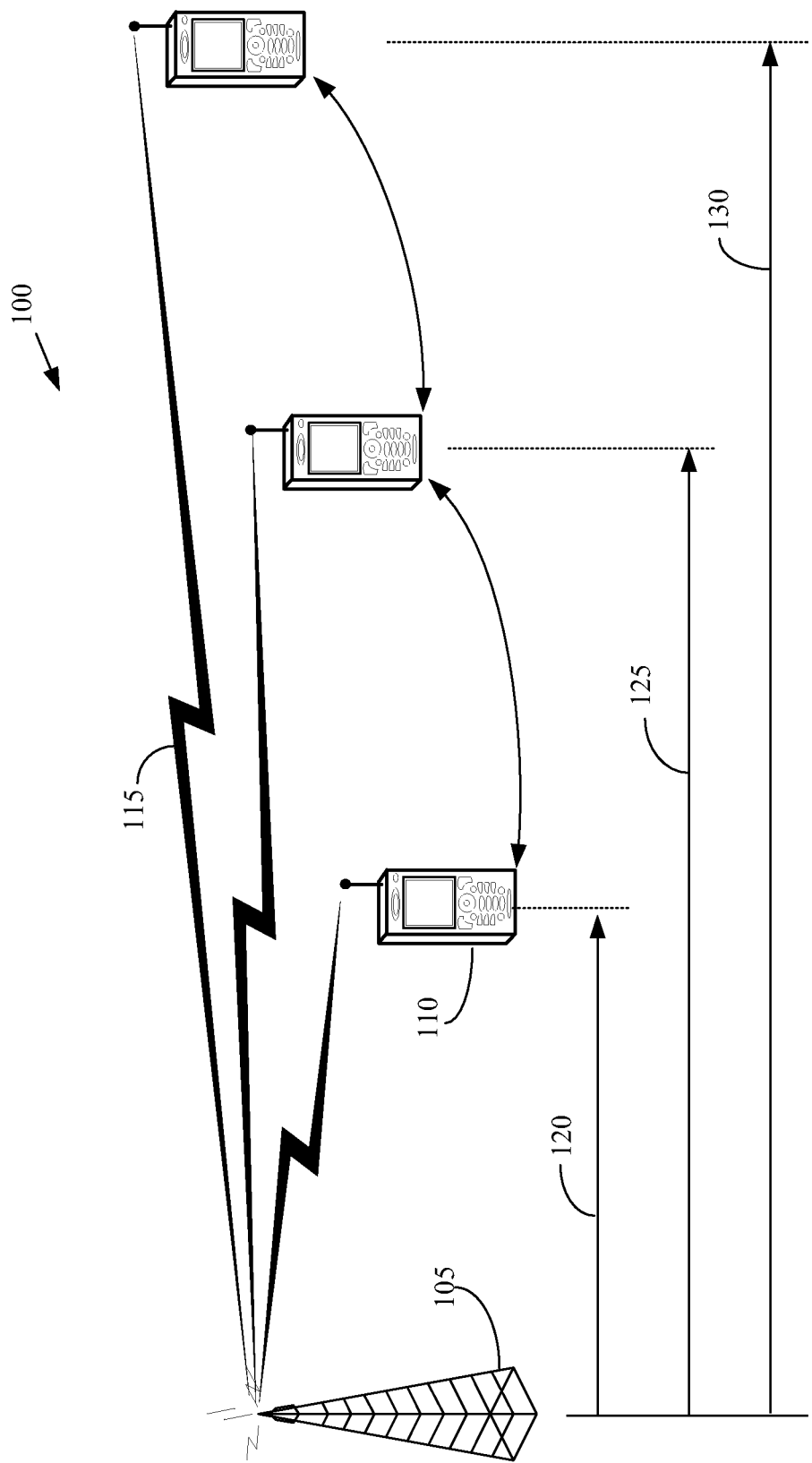
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 includes a base station 105 that provides wireless connectivity to a mobile unit 110 according to one or more protocols and/or standards. The protocols and/or standards may include Universal Mobile Telecommunication System (UMTS) standards and/or protocols, Global System for Mobile communications (GSM) standards and/or protocols, Code Division Multiple Access (CDMA, CDMA2000) standards and/or protocols, Bluetooth standards, one or more of the IEEE 802 standards, and the like. Furthermore, the present invention is not limited to base stations 105 and, in alternative embodiments, the wireless communication system 100 may include one or more node-Bs, access nodes, access networks, base station routers, and the like for providing wireless connectivity to the mobile units 110. The mobile units 110 may also be referred to as "mobile terminals," "access terminals," "subscriber terminals," "subscriber stations," "mobile stations," and the like.

The mobile unit 110 may form a wireless communication link or air interface 115 with the base station 105. Techniques for forming, maintaining, is and/or providing wireless connectivity over the air interface 115 are known in the art and in the interest of clarity only those aspects of forming, maintaining, is and/or providing wireless connectivity over the air interface 115 that are relevant to the present invention will be discussed further herein. Information including signaling information, voice and/or data may be transmitted from the base station 105 to the mobile unit 110 over the air interface 115 at a selected transmission speed or rate. For example, the base station 105 may transmit information to the mobile unit 110 at a transmission speed of approximately 54 Mbps when the mobile unit 110 at a distance 120 from the base station 105.

The transmission speed used to transmit information over the air interface 115 may be modified, e.g., in response to changing conditions and/or characteristics of the air interface 115. Changes in the transmission speed will be referred to hereinafter as "transmission speed adaptations." In the illustrated embodiment, the base station 105, the mobile unit 110, and/or other entities within the wireless communication system 100 may initiate a transmission speed adaptation when the mobile unit 110 detects a reduction in the signal quality or strength as it moves away from the base station 105. For example, the mobile unit 110 may move from the distance 120 to the distance 125 and/or the distance 130 away from the base station 105. At either the distances 125 or 130 (or some distance in between), the mobile unit 110 may fail to decode a particular transmission or the decoding failure rate may increase above a predetermined threshold. The mobile unit 110 may then request a transmission speed adaptation, e.g., the mobile unit 110 may request that information be transmitted at a lower, more robust data rate.

The base station 105, the mobile unit 110, and/or other entities within the wireless communication system 100 may predict the occurrence of transmission speed adaptations based on present and/or prior conditions associated with the air interface 115. At least in part because of the small number of available transmission speeds and the relatively large changes between available transmission speeds, transmission speed adaptations are difficult to predict based only on the current transmission speed. However, transmission speed adaptations may be associated with changes in signal-to-noise ratios for signals and/or information transmitted over the air interfaces 115. Accordingly, in one embodiment in accordance with the present invention, the transmission speed adaptations may be predicted using one or more measured signal-to-noise ratios associated with the mobile unit 110.

Figure 2:
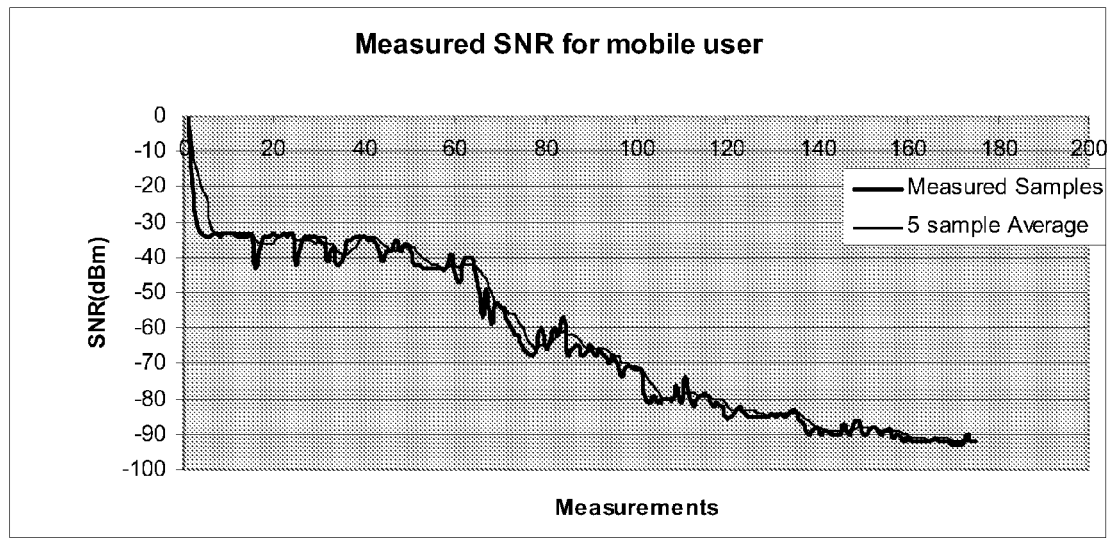
FIG. 2 shows measured samples of signal-to-noise ratios for a mobile unit moving away from an IEEE 802.11g access point at a low velocity, in accordance with the present invention.

FIG. 2 shows measured samples of signal-to-noise ratios for a mobile unit moving away from an IEEE 802.11g access point at a low velocity. The vertical axis indicates the signal-to-noise ratio in dBm in the horizontal axis indicates the measurement points. The measured samples are indicated by a bold line and five-sample moving averages are indicated by a thin line. The measured signal-to-noise ratio is initially nearly constant while the mobile unit is proximate to the access point and then declines approximately linearly as the number of measurements (and hence the distance between the station and the access point) increases. In the illustrated embodiment, the first samples should be ignored as they average over a zero-initialized averaging array.

Figure 3:
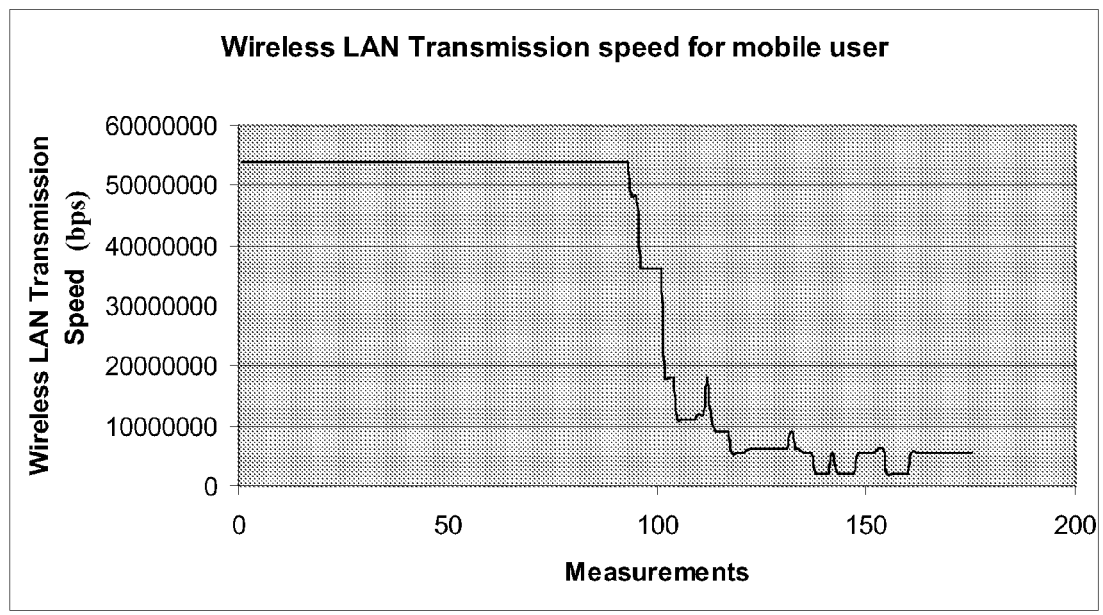
FIG. 3 shows the transmission speed corresponding to the measured signal-to-noise ratios shown in FIG. 2, in accordance with the present invention.

FIG. 3 shows the transmission speed corresponding to the measured signal-to-noise ratios shown in FIG. 2. The vertical axis indicates the transmission speed in bits per second and the horizontal axis indicates the measurement points corresponding to the measurements of the signal-to-noise ratios shown in FIG. 2. The transmission speed remains nearly constant until the signal-to-noise ratio reaches a value of approximately −80 dBm, at which point the transmission speed decreases rapidly by fairly coarse-grained steps as the signal-to-noise ratio continues to decline. For example, access points that operate according to IEEE 802.11g support only 12 possible transmission speeds, and this is also the maximum number of transmission speeds supported by most wireless local area network devices. In contrast, the signal-to-noise ratios may vary at integer values from −30 to −93 dBm, depending on the concerned device implementation and measurement circumstances.

Referring back to FIG. 1, transmission speed adaptations may be predicted by extrapolating from a current signal-to-noise ratio to a future signal-to-noise ratio. In one embodiment, the current signal-to-noise ratio measured by the mobile unit 110 is combined with one or more previous signal-to-noise ratios measure by the mobile unit 110 so that the current signal-to-noise ratio may be linearly extrapolated to predict a future signal-to-noise ratio for the mobile unit 110. However, persons of ordinary skill in the art having benefit of the present disclosure should appreciate that the present invention is not limited to linear extrapolations. In alternative embodiments, other techniques for predicting the future signal-to-noise ratio, such as higher order extrapolations and/or interpolations, spline extrapolations and/or interpolations, and the like, may be used to predict the future signal-to-noise ratio. The predicted signal-to-noise ratio may then be used to predict the future transmission speed using a model, such as a matrix relating current transmission speeds, predicted signal-to-noise ratios, and predicted future transmission speeds associated with the mobile unit 110.

Figure 4:
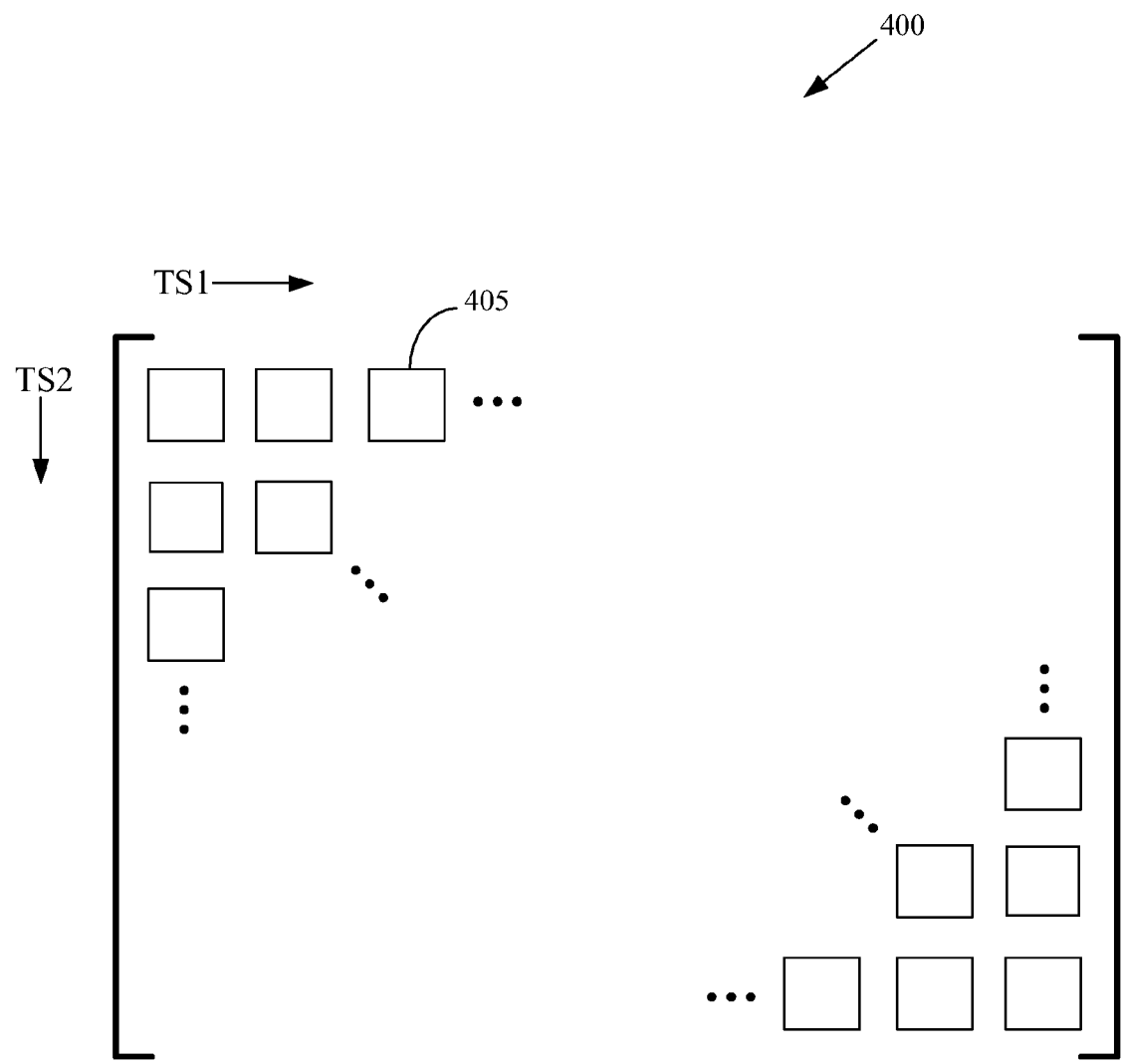
FIG. 4 conceptually illustrates one exemplary embodiment of the matrix that may be used to predict transmission speed adaptations associated with a mobile unit, in accordance with the present invention.

FIG. 4 conceptually illustrates one exemplary embodiment of the matrix 400 that may be used to predict transmission speed adaptations associated with a mobile unit. In various alternative embodiments, the matrix 400 may be maintained at any location including a mobile unit, a base station, or another entity in a wireless communication system. Furthermore, the matrix 400 and/or algorithms for determining future transmission speeds based on the matrix 400 may be implemented in hardware, software, firmware, or any combination thereof. In the illustrated embodiment, the matrix includes a plurality of elements 405 that are indexed by a measured transmission speed (TS1) along the vertical axis and a predicted transmission speed (TS2) along the horizontal axis. The matrix elements 405 include information indicative of values of a signal-to-noise ratio associated with the measured and predicted transmission speeds (TS1, TS2). In one embodiment, the diagonal elements 405 are not filled (or are set to zero) because the diagonal elements 405 are associated with events that results in the transmission speed remaining the same, which may not be considered a transmission speed adaptation event.

The matrix 400 is used to map the current transmission speed and the expected signal-to-noise ratio to an expected transmission speed. In one embodiment, the matrix 400 can be pre-defined. For example, rather than recording an initially empty matrix 400 a default matrix can be used to improve the accuracy of the first predictions. The matrix 400 may also be recorded or modified during regular operation of the mobile unit(s), e.g., based on measurements of signal-to-noise ratios and actual transmission speed adaptations performed during operation of the mobile unit. Thus, the matrix 400 maybe updated if a transmission speed adaptation occurs. For example, if TS1 is measured at time $T_1$ and the actual transmission speed is adapted to TS$_2$ at time $T_2$, then the matrix element (TS$_1$, TS$_2$) may be modified to include the measured signal-to-noise ratio at time $T_2$, $T_1$, an average of the measured signal-to-noise ratios, or any other value related to and/or derived from the measured signal-to-noise ratios.

The matrix 400 may be modified using a variety of techniques. In one embodiment, existing signal-to-noise ratio values indicated in the matrix elements 405 of the matrix 400 can be averaged or replaced by newly measured values. For example, an element 405 can be averaged with a new sample when the element 405 associated with the transmission speeds (TS$_1$, TS$_2$) has already been set to a certain signal-to-noise ratio value. A second matrix (not shown) may therefore be used to record and/or maintain information indicating a number of transitions from one transmission speed to the other, and this information may be used to perform the averaging. As the number of transmission speed adaptations increases, the prediction for the associated mobile unit may become more accurate, at least in part because the information associated with previous transmission speed adaptations has been used to modify and/or update the elements 405 of the matrix 400.

Figure 5:
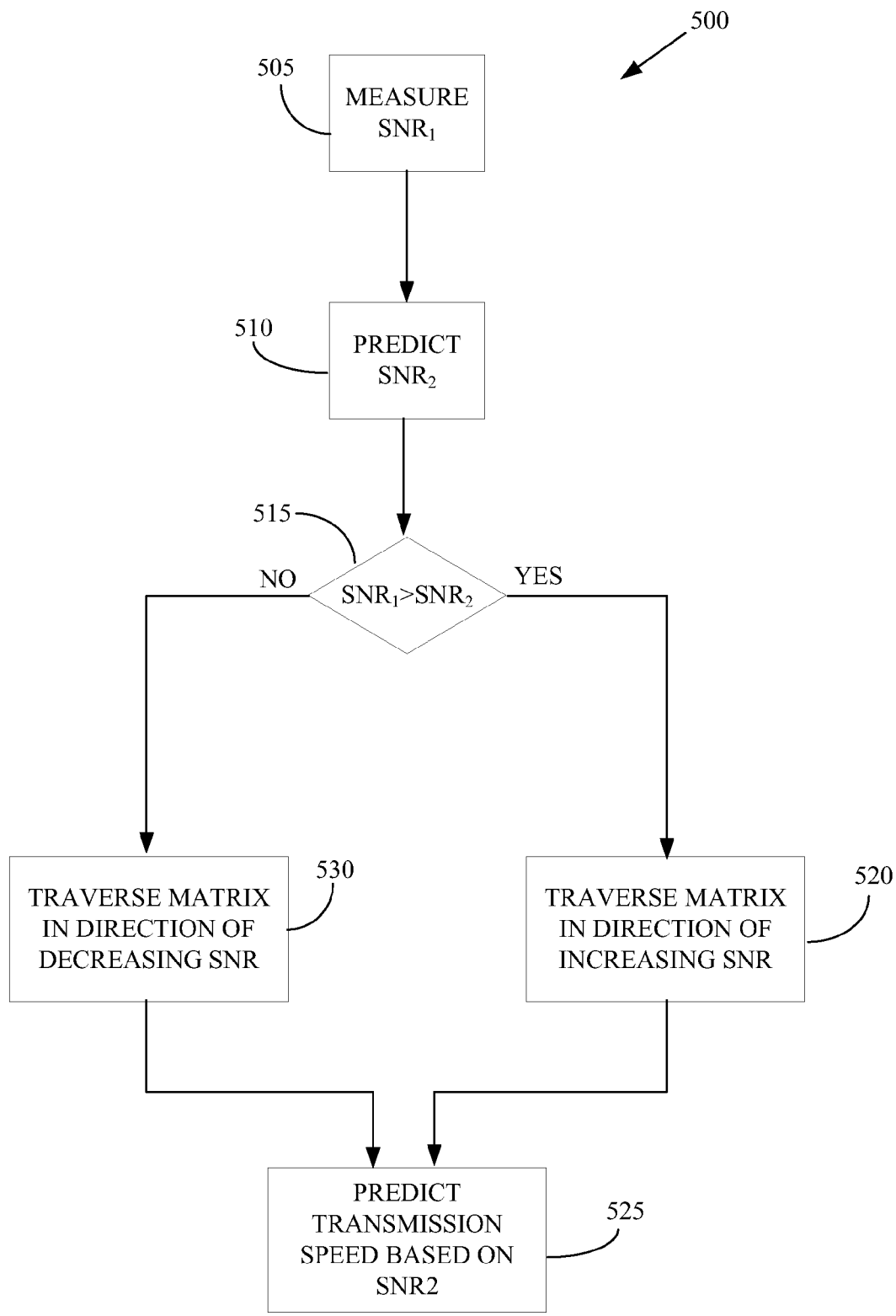
FIG. 5 conceptually illustrates one exemplary embodiment of a method for predicting transmission speed adaptations, in accordance with the present invention.

FIG. 5 conceptually illustrates one exemplary embodiment of a method 500 for predicting transmission speed adaptations. In the illustrated embodiment, the method 500 is implemented assuming that a matrix, such as the matrix 400 shown in FIG. 4, is used for the mapping. The method 500 also assumes that the matrix elements are indexed by a measured transmission speed (TS1) along the vertical axis (e.g., the row indices) and a predicted transmission speed (TS2) along the horizontal axis (e.g., the column indices), and the row and column indices are sorted in an ascending rate. A signal-to-noise ratio (SNR1) may be measured (at 505) and then a future signal-to-noise ratio (SNR2) may be predicted (at 510). For example, the future signal-to-noise ratio may be predicted (at 510) by extrapolating from the signal-to-noise ratio that was measured (at 505), as discussed above.

The wireless communication system may then determine (at 515) whether the signal-to-noise ratio is increasing or decreasing. In one embodiment, the matrix elements may be searched for valid entries. An entry in the matrix is considered valid if the transmission speed adaptation associated with the matrix element (i.e. the transmission speed adaptation from TS1 to TS2) has occurred and been recorded before, either as an initial value or as part of a later modification. For example, if SNR1 is larger than SNR2, which indicates a decreasing signal-to-noise ratio, then the matrix elements along the row TS₁ are traversed (at 520) starting from the first column in increasing order (possibly up to TS2=TS1). The transmission speed (TS₂) may then be predicted (at 525) by selecting the transmission speed corresponding to the last valid matrix element associated with a signal-to-noise ratio that is larger than or equal to SNR2. However, persons of ordinary skill in the art having benefit of the present disclosure should appreciate that the present invention is not limited to traversing the matrix elements in increasing order when SNR1 is larger than SNR2 and, in alternative embodiments, any technique or pattern for traversing the matrix elements may be used.

If SNR1 is smaller than SNR2, which indicates an increasing signal-to-noise ratio, then the matrix elements along the row TS₁ are traversed (at 530) starting from the last column in decreasing order. The transmission speed (TS₂) may then be predicted (at 525) by selecting the transmission speed corresponding to the last valid matrix element associated with a signal-to-noise ratio that is smaller than SNR2. However, persons of ordinary skill in the art having benefit of the present disclosure should appreciate that the present invention is not limited to traversing the matrix elements in decreasing order when SNR1 is smaller than SNR2 and, in alternative embodiments, any technique or pattern for traversing the matrix elements may be used.

In one embodiment, all entries from the maximum (or minimum) transmission speed in the matrix are traversed (at 520, 530) until a valid entry corresponding to the predicted transmission speed is identified, at least in part because under the circumstances of an increasing (or decreasing) signal-to-noise ratio the transmission speed is unlikely to decrease (or increase). However, persons of ordinary skill in the art having benefit of the present disclosure should appreciate that this is not necessary for the practice of the present invention. Furthermore, if one or more of the conditions described above do not hold or do not yield a transmission speed, the method 500 may set TS2 equal to TS1, indicating that no transmission speed adaptation has been predicted. In one embodiment, the wireless communication system may only respond to an increasing or decreasing signal-to-noise ratio depending on the measured signal-to-noise ratio characteristics. This approach may provide sufficiently accurate results in some systems, e.g., systems where the signal-to-noise ratio increases on the shorter term albeit the longer term shows a decreasing trend, or vice versa.

Referring back to FIG. 1, the wireless communication system 100 (or some entity therein) may use predicted transmission speed adaptations to accommodate potential changes associated with transmissions at the predicted transmission speeds. For example, a wireless communication system 100 may perform a system reconfiguration and/or a resource reallocation in response to predicting one or more transmission rate adaptations associated with one or more mobile units 110. The system reconfiguration and/or resource reallocation may be performed in response to a predicted transmission speed adaptation associated with a single mobile unit 110 or predicted transmission speed adaptations associated with numerous mobile units 110. For example, the wireless communication system 100 may form one or more statistical measures of predicted system resource consumption using the predicted transmission speed data stations associated with a plurality of mobile units 110 in the wireless communication system 100. The wireless communication system 100 may then perform one or more system reconfiguration's and/or resource reallocations based upon the statistical measures.

Embodiments of the techniques described above may have the number of advantages over conventional practice. For example, the expected transmission speed at the next time interval can be obtained (and transmission speed adaptations predicted) more efficiently than in conventional practice by mapping from the combination of the expected signal-to-noise ratio and the current transmission speed, e.g., using a matrix as described above. Furthermore, when no standardized techniques for determining when to perform a transmission speed adaptation exist, as is currently the case, embodiments of the techniques described above can determine the transmission speed at the next time interval, regardless of the device implementation or even the supported wireless standards. As the rate adaptation matrix may be recorded during normal operations, the prediction techniques described above can be trained to identify possible transmission speed transitions (and even the transmission speeds that are supported) for circumstances specific for the concerned wireless device and wireless standards used.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   predicting, at a base station during a first time interval, a request for a transmission rate adaptation from a mobile unit for wireless communication between the base station and the mobile unit, the prediction being based on at least one signal-to-noise ratio associated with communication between the base station and the mobile unit during at least the first time interval, and wherein the predicted request is for a transmission rate adaptation that is predicted to occur during a second time interval subsequent to the first time interval; and
   performing, prior to the second time interval, at least one of a system reconfiguration and a resource reallocation for communication between the base station and the mobile unit at a predicted transmission rate during the second time interval.

2. The method of claim 1, comprising predicting said at least one signal-to-noise ratio.

3. The method of claim 2, wherein predicting said at least one signal-to-noise ratio comprises determining at least two signal-to-noise ratios for at least two transmissions associated with the mobile unit.

4. The method of claim 3, wherein predicting said at least one signal-to-noise ratio comprises determining at least two signal-to-noise ratios for at least two transmissions occurring during at least two different time intervals prior to the second time interval.

5. The method of claim 3, wherein predicting said at least one signal-to-noise ratio comprises extrapolating based on said at least two signal-to-noise ratios.

6. The method of claim 1, wherein predicting the transmission rate adaptation comprises determining the predicted transmission rate, based on said at least one signal-to-noise ratio.

7. The method of claim 6, wherein determining the predicted transmission rate comprises determining the predicted transmission rate based on a model relating said at least one signal-to-noise ratio to the predicted transmission rate.

8. The method of claim 7, wherein determining the predicted transmission rate comprises determining the predicted transmission rate based on a first matrix relating a plurality of signal-to-noise ratios to a plurality of transmission rates.

9. The method of claim 8, comprising determining the first matrix.

10. The method of claim 9, wherein determining the first matrix comprises determining a plurality of initial values of matrix elements relating the plurality of signal-to-noise ratios to the plurality of transmission rates.

11. The method of claim 9, wherein determining the first matrix comprises determining at least one value of at least one matrix element relating at least one signal-to-noise ratio to at least one transmission rate based upon measurements of at least one signal-to-noise ratio and at least one corresponding transmission rate.

12. A method, comprising:
   determining, at a base station, at least one first matrix relating a plurality of signal-to-noise ratios to a plurality of transmission rates, wherein determining said at least one first matrix comprises modifying at least one value of at least one first matrix element relating at least one signal-to-noise ratio to at least one transmission rate based upon measurements of at least one signal-to-noise ratio performed by the base station and at least one corresponding transmission rate; and
   predicting, at the base station, at least one transmission rate adaptation associated with at least one mobile unit based on at least one signal-to-noise ratio associated with said at least one mobile unit, wherein predicting said at least one transmission rate adaptation comprises determining at least one transmission rate based on said at least one signal-to-noise ratio and said at least one first matrix.

13. A method, comprising:
   determining, at a base station, at least one first matrix relating a plurality of signal-to-noise ratios to a plurality of transmission rates, wherein determining said at least one first matrix comprises determining said at least one first matrix based on information indicating a number of transitions from one transmission rate to another transmission rate; and
   predicting, at the base station, at least one transmission rate adaptation associated with at least one mobile unit based on at least one signal-to-noise ratio for transmission between the base station and said at least one mobile unit, wherein predicting said at least one transmission rate adaptation comprises determining at least one transmission rate based on said at least one signal-to-noise ratio and said at least one first matrix.

14. The method of claim 13, wherein determining said at least one matrix based on the information indicating the number of transitions from one transmission rate to another transmission rate comprises accessing the information indicating the number of transitions from one transmission rate to another transmission rate from at least one second matrix.

* * * * *